INVENTOR.
NEWTON L. CHATHAM
BY
*Wesley Everett*
ATTORNEY

United States Patent Office 3,435,634
Patented Apr. 1, 1969

3,435,634
WIRE CABLE HOUSING
Newton L. Chatham, Williamsport, Pa. 17701
Filed Mar. 6, 1967, Ser. No. 620,832
Int. Cl. F16c 1/06, 1/26, 1/10
U.S. Cl. 64—3                                       7 Claims

ABSTRACT OF THE DISCLOSURE

A helically wound spiral flexible cable housing adapted to be wound about a bendable plastic tube through which a cable is operable either longitudinally of the tube or axially of the tube. The housing is constructed of a flat stock or wire of rectangular cross sectional form having one of its lateral edges formed with a groove and its opposite edge of a tongue-like form to engage the groove of the adjacent spiral when the wire is wound into a spiral. The housing is wound so that the tongue-like edge frictionally engages the groove to minimize the compression factor of the housing.

This invention relates in general to flexible wire cables which are formed of a helically wrapped wire forming a flexible housing and which enclose a flexible wire core cable designed to transmit either rotary or reciprocatory motion from one end to the other. As examples of the uses of such cables, the type which transmits rotary motion is frequently found in automobiles to connect a rotary shaft of the drive train of the automobile with the odometer and speedometer to record mileage traveled and the speed of the vehicle, while the reciprocatory type is used in particular on automobiles for the operation of mechanical brakes, controlling the carbureter throttle, etc. However, this invention is not intended to be limited to the automobile field alone, but may have other uses such as aircraft controls, motor and sailboat controls, or other uses wherein the present features would be advantageous.

Helically wrapped housings for wire cables have heretofore been widely used but they have been found to possess certain disadvantages such as inability to withstand sufficient compressive or columnar loads, which under certain circumstances results in the helical windings getting out of line so that maintaining constant length or undue stiffness which inhibits ready flexing of the cable becomes a problem. In addition, many prior cables when flexed or bent will produce too great a change in the length of the center line through the housing which may have the same effect on the device controlled as pulling the wire core would have.

It is one object of the invention to produce a helically wrapped flexible housing in which the helically wrapped wire is provided with substantially flat parallel inner and outer surfaces, having one lateral edge grooved to form a seat and a tapered seat engaging portion extending along the opposite edge.

It is anoter object to produce such a housing which is capable of easy lateral flexing.

It is still another object to produce such a housing which, when laterally flexed, will reduce to a minimum any change in the total length of the center line through the housing.

It is an additional object of the invention to produce a flexible outer housing capable of engaging a liner element to prevent longitudinal movement of said liner within the helically wound housing.

Figure 1:
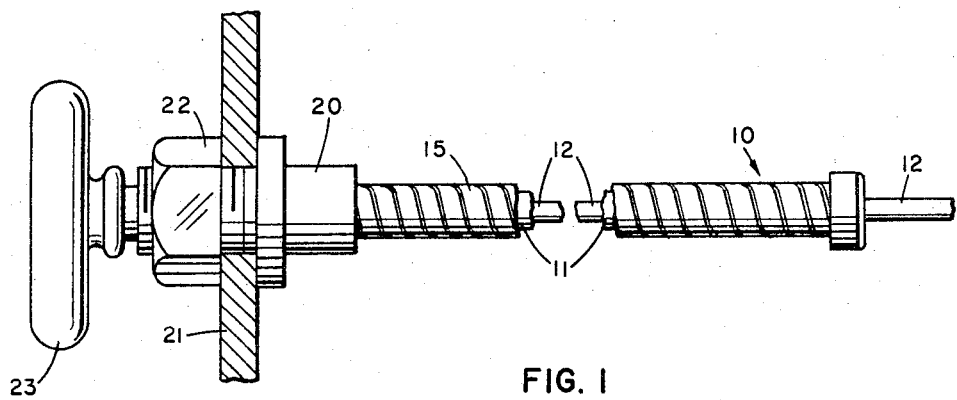
Figure 2:
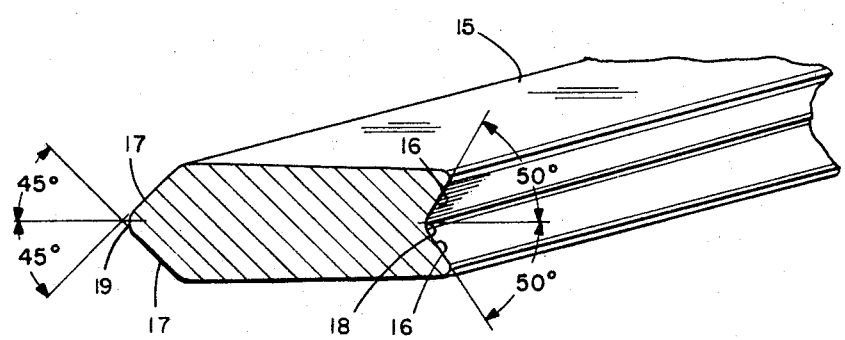
Figure 3:
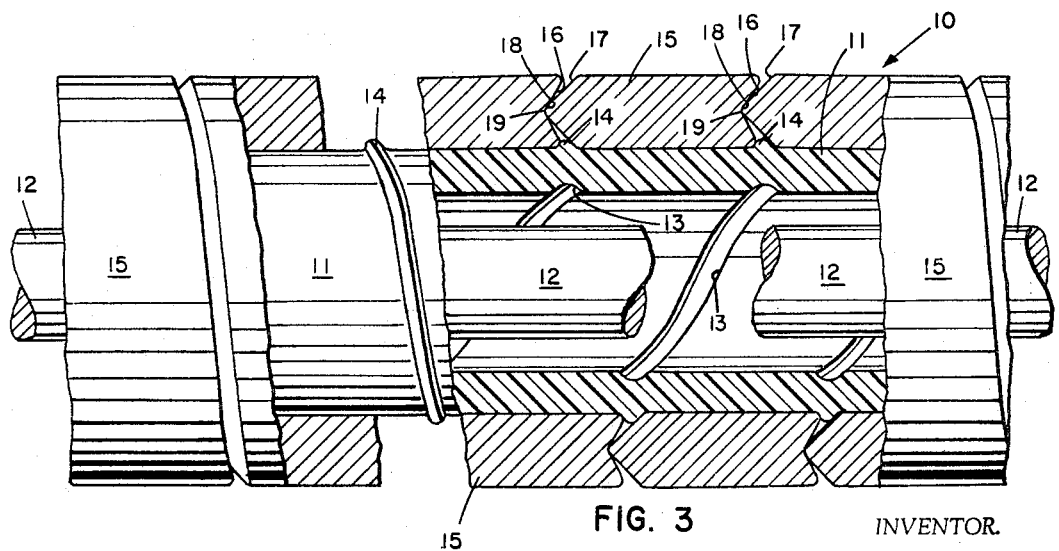

The above and further objects and advantages will become more apparent as this description proceeds, and a preferred embodiment of the invention is described hereinafter, with reference to the accompanying drawing, wherein FIGURE 1 is a side elevational view partly in section of a length of flexible cable with one end mounted in a panel together with a manual control knob for illustrating the cable when used with a reciprocating coil wire;

FIGURE 2 is an enlarged fragmentary elevational view with portions broken away and partly in section of a length of such cable; and FIGURE 3 is a perspective view showing a section on an enlarged scale, of a section of the wire from which the helically wound housing for the cable is formed.

In the embodiment shown in the drawing, the cable is made up of outer helically wound flexible housing generally indicated at 10, a liner 11 within the housing and about which the outer housing is tightly wound and an inner flexible core wire 12 within the liner, the latter being either rotatable or reciprocal within the liner depending upon whether the cable is used to transmit rotary or reciprocating motion.

The liner 11 is preferably made of nylon or similar elastomer material which is readily deformable and flexible. In the example illustrated the liner is shown deformed by the tightly wound wire forming the housing so as to form a helical groove 13 on its inner surface and a helical rib 14 on its outer surface between adjacent turns of the helically wound wire. The groove 13 on the inner surface of the liner finds use as a lubricant retainer pocket in the event a lubricant is used, and fixing the position of the liner along the inner surface of the helically wound wire.

A most important feature of the instant invention resides in the specific cross-sectional shape of the wire from which the helically wound housing is formed. As shown, this wire 15 is of substantially rectangular form having its flat elongated sides substantially in parallel planes and of a width approximately two and one-half to three times its thickness, wound flatwise to form the spiral housing, each turn lying adjacent the next in edge to edge proximity, or contact. The wire 15 is provided with a continuous longitudinal V-shaped groove 16 in one edge, while the opposite edge is formed into a continuous longitudinal V-shaped nose 17. The bottom of the V-shaped groove is rounded as shown at 18 and the V-shaped nose is similarly rounded as shown at 19. It can be seen that the rounded nose 19 of each turn of the spiral housing cooperates with and seats in the rounded bottom of the groove 18 in the next adjacent turn. The angle of the V-groove 16 is made slightly greater than the angle of the V-nose 17. In the embodiment illustrated the groove angle is 50° while the nose angle is 45°, but these specific angles are not critical and may be adjusted to meet certain specific circumstances or requirements. This construction allows one turn of the spiral housing to shift out of alignment with the next adjacent turn as would take place under lateral deflection of the cables. Under such deflection the rounded nose 19 of one turn will pivot or fulcrum in the rounded groove bottom 18 of the next adjacent turn.

In the embodiment illustrated the rounded bottom 18 and the rounded nose 19 of the strip 15 are shown located on a center line through the strip. It is emphasized, however, that this is for illustration only, as it is obvious that the groove bottom and nose may be moved closer to either the inner or outer surface of the strip without departing from spirit of the invention.

Similarly in the example shown the rounded nose of each convolution of strip is shown to be in tight contact with groove bottom of the next adjacent convolution. Under certain conditions of use however, it may be found advantageous to slightly space these elements. For example, when the cable is used to transmit longitudinal movement each spacing of a few thousandths of an inch permits a slight springiness in the cable thus eliminating what is known as "shock-load" or too sudden an application of the longitudinal force on the cable. However, where the cables are compressed, the nose 19 will enter the recessed groove 15 and will keep the windings in alignment.

While the helically wound flat wire 15 is illustrated as being wrapped in one direction, it may be wrapped in the opposite direction either for convenience in manufacturing, or by design.

FIGURE 1 illustrates a cable for use in transmitting longitudinal motion. In such an installation a flanged and threaded thimble 20 is fixed to one end of the housing 10 which serves as a means to support the end of the housing in an aperture in a panel 21. A threaded nut 22 clamps the thimble to the panel. A manual control knob 23 fastened to the end of the wire core cable 12 completes the assembly.

Having thus described a preferred form of the invention, I wish it to be understood that I do not desire to be limited strictly thereto, but only to the extent required by the prior art and as defined by the following claims.

I claim:
1. A flexible cable housing comprising:
    (a) a flat wire wrapped helically with successive turns adjoining one another edge to edge, and
    (b) a continuous groove running the length of one edge of the flat wire and a continuous nose portion running the length of the other edge thereof, the nose portion of one edge of each turn of the helically wrapped wire fitting the groove in the other edge of the next adjoining turn thereof.

2. A flexible cable housing comprising:
    (a) a flat wire wrapped helically with successive turns adjoining one another edge to edge, and
    (b) a groove substantially V-shaped in cross section in one edge of the flat wire and a nose portion substantially V-shaped in cross section formed on the other edge thereof, the nose portion of one edge of each turn of the helically wrapped wire fitting the groove in the other edge of the next adjoining turn thereof whereby the housing will resist endwise compression.

3. A flexible cable housing according to claim 2 in which the V-shaped nose portion is of slightly smaller angle than the V-shaped groove.

4. A flexible cable housing according to claim 3 in which both the apex of the V-shaped groove and the apex of the V-shaped nose portion are rounded to facilitate fulcruming of the nose portion within the groove.

5. A flexible cable housing according to claim 4 in which the apexes of the V-shaped nose portion and the V-shaped groove are located on a transverse center line through the flat wire.

6. A flexible cable combination comprising:
    (a) a flexible housing comprising:
        (1) a flat wire wrapped helically with successive turns adjoining one another edge to edge
        (2) a V-shaped groove in one edge of the flat wire and a V-shaped nose portion formed on the other edge thereof, the V-shaped nose portion being of slightly smaller angle than the V-shaped groove, the V-shaped nose portion of one edge of each turn fitting the groove in the other edge of the next adjoining turn
        (3) a flexible tubular liner compressively wrapped about by said housing wire and deformed inwardly thereby in a helical zone throughout the length of the liner corresponding to the helix of said housing wire, and
    (b) a flexible wire core cable movably contained within said liner and contacting the same only in the inwardly deformed helical zone in the liner, the portions of the liner between the inwardly deformed helical zone defining a helical groove in the liner adapted to retain lubricant.

7. The combination according to claim 6 in which both the apex of the V-shaped groove and the apex of the V-shaped nose portion are rounded and act as a fulcrum upon lateral deflexion of the cable.

References Cited

UNITED STATES PATENTS

| | | | |
|---|---|---|---|
| 1,068,553 | 7/1913 | Abell | 138—135 |
| 1,987,794 | 1/1935 | Phillips | 138—135 |
| 3,214,995 | 11/1965 | Gilmore | 74—501 |

FOREIGN PATENTS 266,750  10/1927  Great Britain.

HALL C. COE, *Primary Examiner.*

U.S. Cl. X.R.

74—501; 138—135